(12) United States Patent
Coutant et al.

(10) Patent No.: US 7,065,754 B1
(45) Date of Patent: Jun. 20, 2006

(54) METHOD AND APPARATUS FOR SWITCHING BETWEEN MULTIPLE IMPLEMENTATIONS OF A ROUTINE

(75) Inventors: Cary A. Coutant, Saratoga, CA (US); Carol L. Thompson, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 946 days.

(21) Appl. No.: 09/702,593

(22) Filed: Oct. 31, 2000

(51) Int. Cl.
*G06F 9/45* (2006.01)

(52) U.S. Cl. .................. 717/146; 717/164; 717/166; 712/36

(58) Field of Classification Search ........ 717/140–167; 712/300, 36
See application file for complete search history.

(56) References Cited

U.S. PATENT DOCUMENTS

| | | | | |
|---|---|---|---|---|
| 5,111,413 A | * | 5/1992 | Lazansky et al. | 703/14 |
| 5,276,881 A | * | 1/1994 | Chan et al. | 717/147 |
| 5,613,117 A | * | 3/1997 | Davidson et al. | 717/144 |
| 6,151,618 A | * | 11/2000 | Wahbe et al. | 709/1 |
| 6,445,468 B1 | * | 9/2002 | Tsai | 358/402 |

* cited by examiner

*Primary Examiner*—Tuan Dam
*Assistant Examiner*—Chuck Kendall

(57) ABSTRACT

Method and apparatus for switching between multiple implementations of a routine. A plurality of implementations of a routine are compiled into respective object code modules. In one embodiment, each implementation of the routine is adapted for a particular hardware configuration. The different object code modules are associated with respective sets of hardware characteristics and with the name of the routine. When the application program and library are loaded into memory of the computer system, a references to the routine are resolved using the sets of hardware characteristics and the hardware configuration of the system.

16 Claims, 3 Drawing Sheets

METHOD AND APPARATUS FOR SWITCHING BETWEEN MULTIPLE IMPLEMENTATIONS OF A ROUTINE

FIELD OF THE INVENTION

The present invention generally relates to management of binary program code for different implementations of a processor architecture, and more particularly to switching between multiple implementations of a routine that are associated with the implementations of a processor architecture.

BACKGROUND

It is common to build multiple implementations of a basic processor architecture for the purpose of providing various performance and pricing options. For example, a processor architecture that supports a particular instruction set may have a first-level cache in one implementation, and another implementation may have first and second level caches.

Some system-provided routines and other library routines are written and compiled to exploit the performance characteristics of a particular implementation of a processor. For example, a memory-to-memory copy routine may be written and compiled differently from one implementation to another. While the binary code will execute correctly on any implementation, there may be a negative impact on performance when the binary code is executed on an implementation other than the target implementation.

A software developer can either develop separate binary libraries for the different implementations, develop a single binary for all implementations, or develop several versions of selected routines along with a run-time switch for selecting between the different versions. Developing separate binary libraries is technically straightforward. However, there is a cost associated with managing and distributing separate binary libraries. If only a single binary library is provided, users may not receive the full performance benefit of a particular implementation. While run-time switches would appear to provide a reasonable tradeoff between the management of multiple binary libraries and performance degradation, the run-time switch introduces overhead when a library call is made to determine the implementation on which the code is executing.

A method and apparatus that address the aforementioned problems, as well as other related problems, are therefore desirable.

SUMMARY OF THE INVENTION

In various embodiments, a method and apparatus are provided for switching between multiple implementations of a routine. In one embodiment, different versions of a library routine are programmed to exploit different features of different computer systems. The different versions are available in a single library, and an application program need not differentiate between the different implementations in using the routine. Using hardware characteristics that are associated with the different versions and hardware characteristics of the computer system on which the application is to be executed, references to the routine are resolved when the application and library are loaded. Thus, execution of the application is not burdened with runtime resolution of references to the routine.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the invention provides a technique for switching between multiple implementations of a library routine that are available in a library of routines. Each implementation of a routine has an associated set of hardware characteristics that indicate the hardware on which the implementation is intended to execute. The hardware characteristics may include, for example, the processor clock speed or a model number, cache configuration, latency of selected hardware operations (load and store, for example), and the availability of certain extensions to the instruction set. When a routine having multiple implementations is loaded, the reference is resolved to the appropriate implementation using the associated hardware characteristics and the hardware characteristics of the host system. Additional hardware characteristics that may be used for different implementations of routines include, for example, bypass characteristics, branch prediction behavior, prefetching capability, information describing stall conditions, branch penalties, size and associativity of processor data structures (not just cache, but branch prediction and ALAT-like structures as well), queue sizes for out-of-order or decoupled processors, and the number of processors in a multi-processor system.

Figure 1:
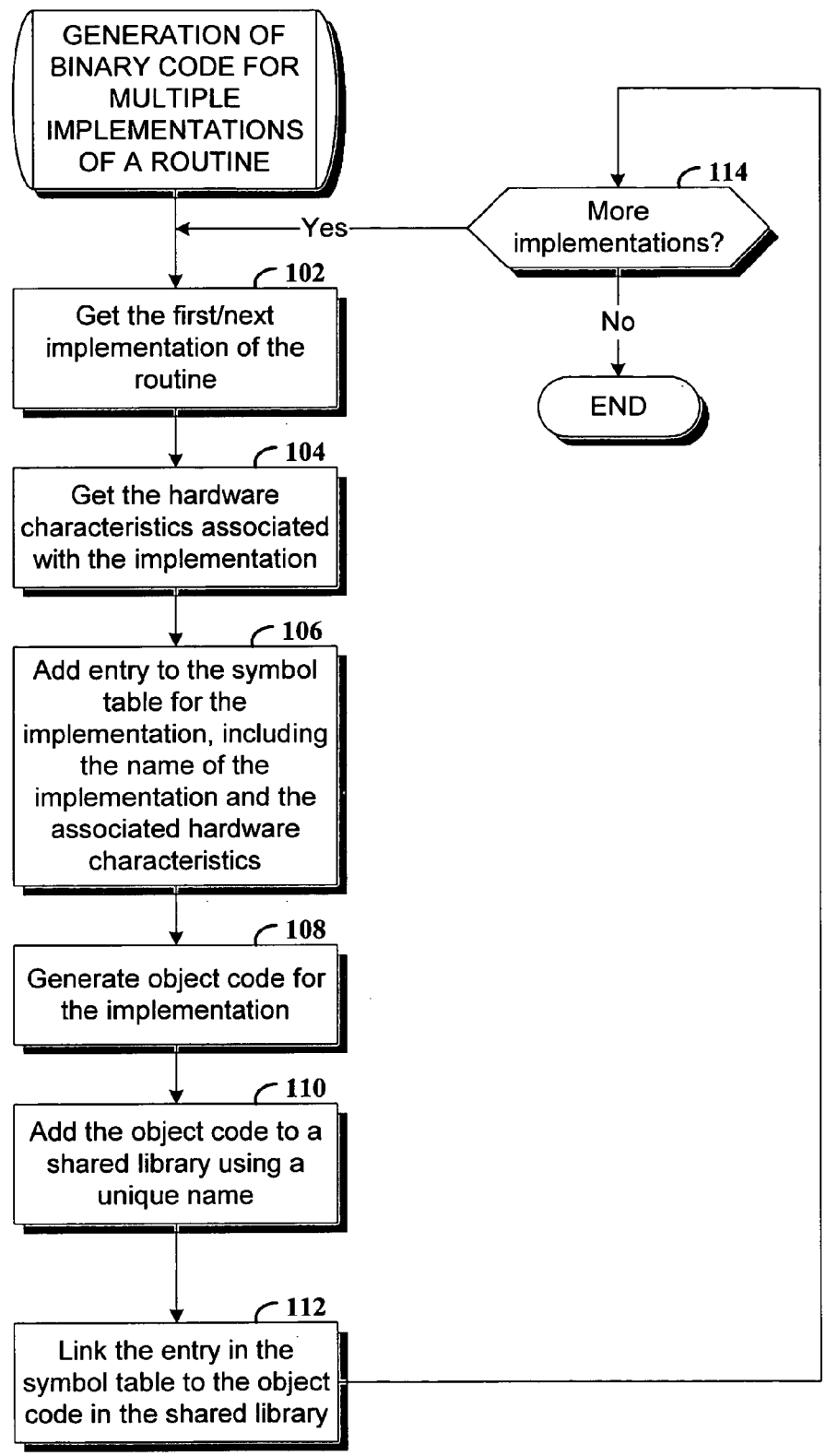
FIG. 1 is a flowchart of a process for generating multiple binary implementations of a routine for different implementations of a particular processor architecture.

FIG. 1 is a flowchart of a process for generating multiple binary implementations of a routine for different implementations of a particular processor architecture, in accordance with one embodiment of the invention. The process generally entails for each implementation of a routine, generating object code modules for the different implementations and adding entries in a symbol table for the different object code modules. An entry in the symbol table for a routine having multiple implementations has an associated set of hardware characteristics. The hardware characteristics are those of the platform on which the associated object code module is intended to execute.

At step 102, the first (or next, depending on the iteration) implementation of the routine is obtained for processing, and at step 104 the hardware characteristics associated with the routine are obtained.

The symbol table is updated at step 106. The symbol table includes names of routines and references to the associated object code modules. For routines having multiple implementations, hardware characteristics are also associated with the routine name in the symbol table. When an application is loaded and bound to the shared library that contains the multiple binary implementations of a routine, the system dynamic loader selects the appropriate implementation from the symbol table based on the hardware characteristics of the host system.

In one embodiment, the hardware characteristics that are to be associated with a routine are provided by the developer in a configuration file that is read by the linker at the time the shared library is being built. In this embodiment, the programmer will have coded different versions of the routine and used different names for the different versions. The information in the configuration file associates the names of the different versions with sets of hardware characteristics and with a generic name.

In another embodiment, the compiler could be adapted to generate multiple object code modules from a source code module. For example, in response to a command-line option, the compiler automatically generates hardware-specialized implementations, generates unique symbol names for the specialized implementations, and generate the mapping information. The mapping information associates the generic routine name with the specialized implementations, and the specialized implementations with sets of hardware characteristics. The mapping information may be stored either in the object file or in a separate configuration file that is used by the linker, for example.

At step 108, the object code module is created for the routine, and the object code module is added to the shared library at step 110. Each routine in the shared library is assigned a unique name.

At step 112, the entry in the symbol table (step 106) is updated to reference the associated object code module in the object code library. Decision step 114 tests whether there are additional implementations to process. If so, control is returned to step 102. Otherwise, the process for generating the multiple implementations is 1 complete.

Figure 2:
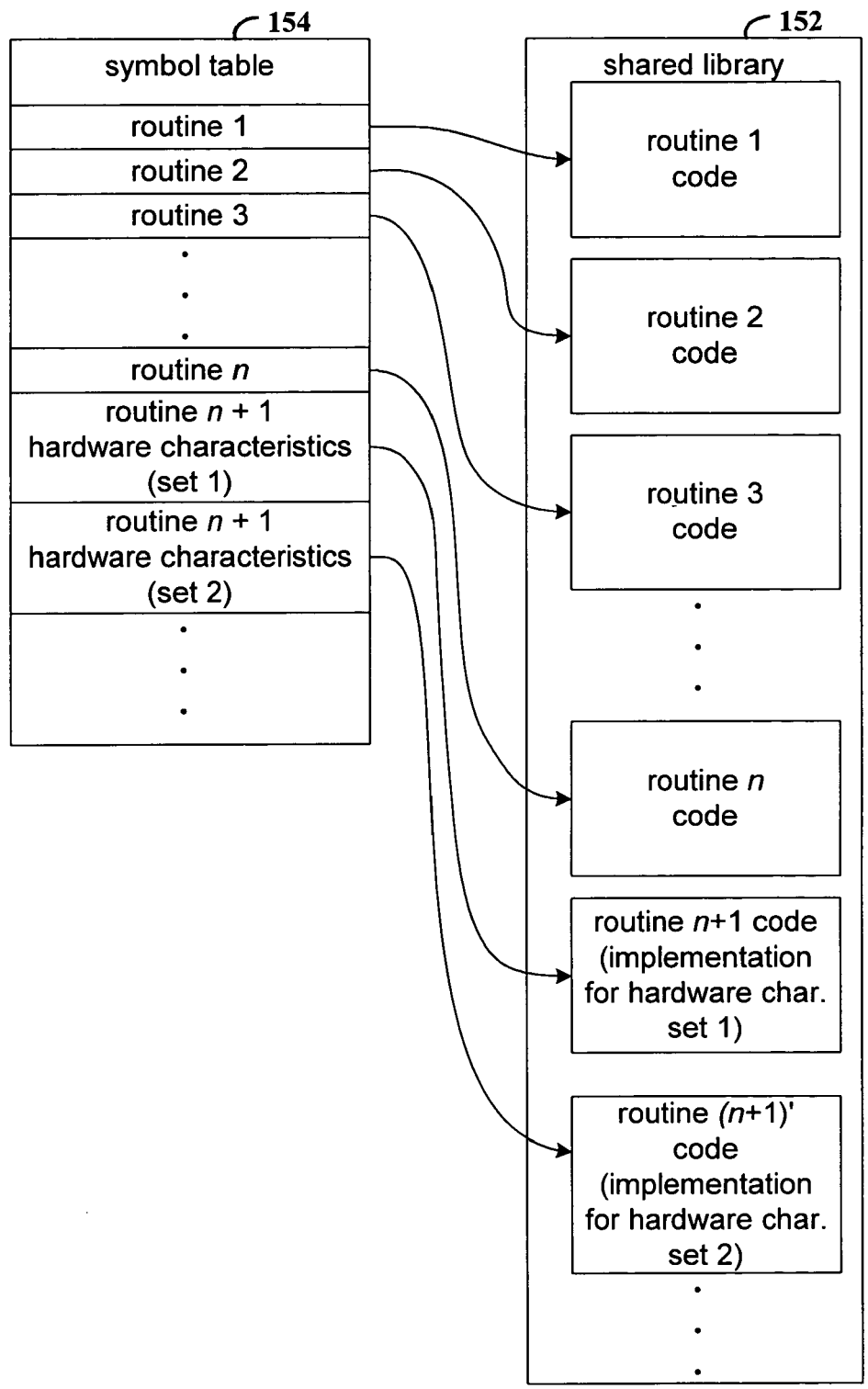
FIG. 2 is a block diagram illustrating a symbol table in relationship to a shared library of object code modules.

FIG. 2 is a block diagram illustrating a symbol table in relationship to a shared library of object code modules. The routines in shared library 152 are object code modules that are associated with and referenced by the entries in symbol table 154.

Routines 1–(n+1) are illustrated in shared library 152. Routines 1–n have single implementations, and two implementations are illustrated for example routine (n+1). The first implementation of routine (n+1) is named routine (n+1), and the second implementation of routine (n+1) is named routine (n+1)'.

Symbol table 154 includes entries for each routine and implementation. Routines 1–n, having only single implementations, include only the routine name and a reference to the corresponding object code module in shared library 152. Routine (n+1) has two implementations, and the entries associated therewith include respective sets of hardware characteristics that describe, for example, the processor for which the implementations were developed. The entry having hardware characteristics set 1 references routine (n+1) code in shared library 152, and the entry having hardware characteristics set 2 references routine (n+1)' code in the shared library.

When an application is loaded and bound to shared library 152, the system dynamic loader selects the appropriate binary implementation from the symbol table based on the hardware characteristics of the host processor. Thus, the reference to the appropriate binary implementation is resolved when the program using the shared library is loaded. Alternatively, some environments may load the shared library after a program begins execution, and in this environment the references are resolved when the shared library is loaded. In either environment, the references are resolved at load time versus runtime. The resolution of the references to routines in the symbol table results in code references to the addresses of the binary implementations in the shared library 152.

By selecting the appropriate object code routine once when the routine is first referenced instead of resolving the reference each time the routine is referenced at run-time, the overhead for the switch occurs in the compiler and loader, thereby eliminating issues with respect to run-time performance and switching to an appropriate implementation of a routine.

Figure 3:
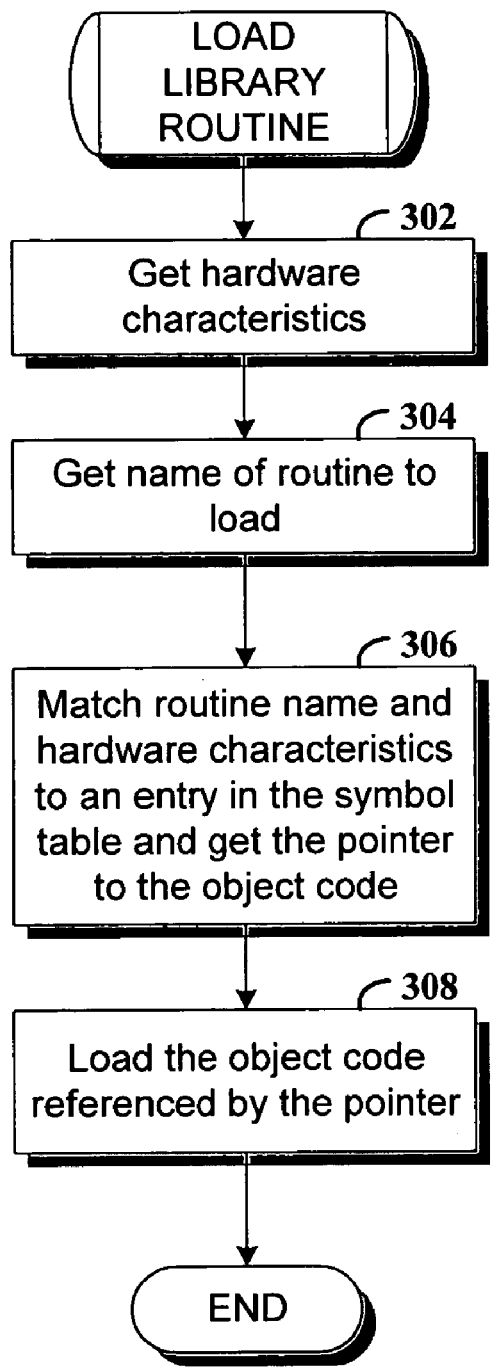
FIG. 3 is a flowchart of a process for loading a library routine in accordance with one embodiment of the invention.

FIG. 3 is a flowchart of a process for loading a library routine in accordance with one embodiment of the invention. At step 302, the hardware characteristics are obtained from a system configuration file, for example. In another embodiment, the characteristics may be obtained, for example, from hardware identification registers or from firmware.

At step 304, the loader obtains the name of the routine to be loaded. For example, an application program may reference a particular shared library routine, and the loader uses the program-specified routine name to locate the proper object code module in the shared library.

The routine name and hardware characteristics are used at step 306 to match an entry in symbol table 154. Using the reference in the matching entry, step 208 loads the referenced object that is associated with the hardware characteristics. Forward from the time that a routine is referenced and the proper object code module is identified and loaded, no further matching of hardware characteristics is required on subsequent references to the routine.

The present invention is believed to be applicable to a variety of systems that switch between multiple implementations of a routine based on hardware characteristics. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for switching between multiple implementations of a routine in a library of routines that are linked with an application program that is hosted by a computer system, comprising:

compiling a plurality of implementations of a routine into respective object code modules, the routine having an associated name and each implementation adapted to a selected hardware configuration;

associating the object code modules with the name of the routine and respective sets of hardware characteristics; and resolving when the application program is loaded into memory of the computer system, a reference to the routine using the sets of hardware characteristics and a hardware configuration of the system.

2. The method of claim 1, further comprising establishing a symbol table having a plurality of entries, each entry including a name of a routine and a reference to an object code module in the library.

3. The method of claim 2, further comprising, for the routine having a plurality of implementations, adding a plurality of entries to the symbol table and associating respective sets of hardware characteristics with the plurality of entries.

4. The method of claim 3, wherein the hardware characteristics include at least one of clock speed of the processor, processor model, cache configuration of the system, hardware operation latency times, instruction set characteristics, bypass characteristics, branch prediction behavior, prefetching capability, information describing stall conditions, branch penalties, size and associativity of processor data structures, queue sizes for out-of-order or decoupled processors, and the number of processors in a multi-processor system.

5. The method of claim 4, wherein the resolving step further comprises obtaining the hardware configuration of the system from at least one of a system configuration data file, one or more system identification registers, and system firmware.

6. The method of claim 3, wherein the resolving step further comprises obtaining the hardware configuration of the system from at least one of a system configuration data file, one or more system identification registers, and system firmware.

7. The method of claim 1, wherein the hardware characteristics include at least one of clock speed of the processor, processor model, cache configuration of the system, hardware operation latency times, and instruction set characteristics.

8. The method of claim 1, wherein the resolving step further comprises obtaining the hardware configuration of the system from at least one of a system configuration data file, one or more system identification registers, and system firmware.

9. A computer-implemented method for switching between multiple implementations of a routine in a library of routines that are linked with an application program hosted by a computer system, comprising:
   establishing a set of hardware configuration characteristics that describe the computer system;
   establishing a symbol table, the symbol table having one or more entries that include a name of a routine, a set of hardware characteristics, and an address referencing a routine in the library;
   obtaining a name of a routine having multiple implementations when the library is loaded with the application program into memory of the computer system;
   matching the name of the routine and the set of hardware configuration characteristics that describe the computer system to an entry in the symbol table; and
   generating an address in executable code for references to the routine having multiple implementations when the library is loaded with the application program, the address referencing an implementation in the library as identified in the matching step by the entry in the symbol table.

10. The method of claim 9, wherein the hardware configuration characteristics include at least one of clock speed of the processor, processor model, cache configuration of the system, hardware operation latency times, and instruction set characteristics.

11. The method of claim 10, wherein the resolving step further comprises obtaining the hardware configuration of the system from at least one of a system configuration data file, one or more system identification registers, and system firmware.

12. The method of claim 9, wherein the resolving step further comprises obtaining the hardware configuration of the system from at least one of a system configuration data file, one or more system identification registers, and system firmware.

13. An apparatus for switching between multiple implementations of a routine in a library of routines that are linked with an application program that is hosted by a computer system, comprising:
   means for compiling a plurality of implementations of a routine into respective object code modules, the routine having an associated name and each implementation adapted to a selected hardware configuration;
   means for associating the object code modules with the name of the routine and respective sets of hardware characteristics; and
   means for resolving when the application program is loaded into memory of the computer system, a reference to the routine using the sets of hardware characteristics and a hardware configuration of the system.

14. A computer-implemented symbol table for referencing a library of object code modules that implement a plurality of routines, comprising:
   a first set of one or more entries, each entry in the first set including a unique name of a routine and a reference to an object code module in the library; and
   a second set of one or more entries, each entry in the second set including a shared name of a routine, a set of hardware characteristics, and a reference to an object code module in the library.

15. The symbol table of claim 14, wherein the hardware characteristics include at least one of clock speed of a processor, processor model, cache configuration, hardware operation latency times, instruction set characteristics, bypass characteristics, branch prediction behavior, prefetching capability, information describing stall conditions, branch penalties, size and associativity of processor data structures, queue sizes for out-of-order or decoupled processors, and the number of processors in a multi-processor system.

16. A computer program product configured for causing a computer to perform the steps of:
   compiling a plurality of implementations of a routine into respective object code modules, the routine having an associated name and each implementation adapted to a selected hardware configuration;
   associating the object code modules with the name of the routine and respective sets of hardware characteristics; and
   resolving when the application program is loaded into memory of the computer system, a reference to the routine using the sets of hardware characteristics and a hardware configuration of the system.

* * * * *